Dec. 28, 1937.　　　C. H. DOCKSON　　　2,103,576
PRESSURE REGULATOR
Filed Jan. 9, 1935　　　2 Sheets-Sheet 1
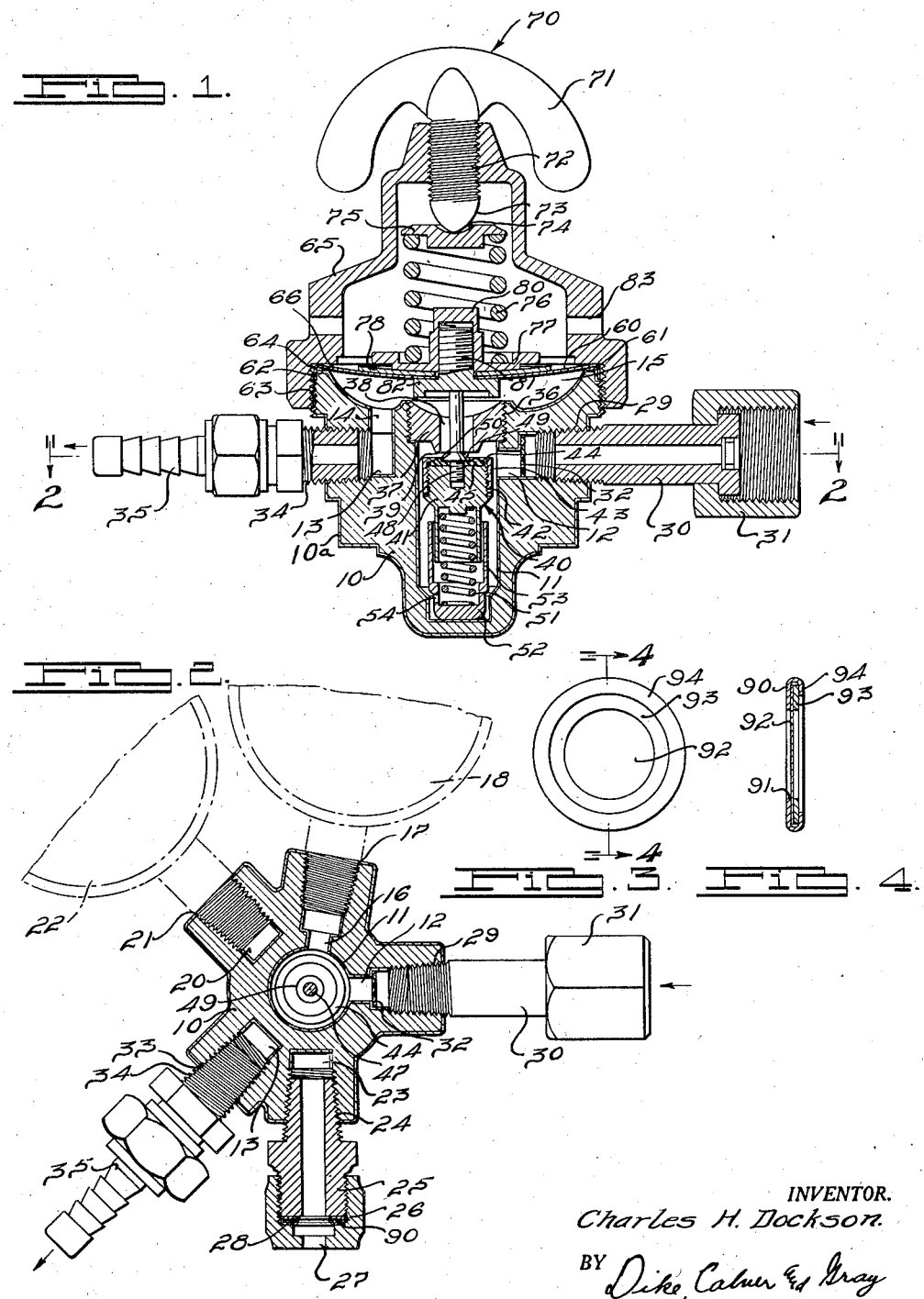
INVENTOR.
Charles H. Dockson.
BY Dike, Calver & Gray
ATTORNEYS.

Dec. 28, 1937.  C. H. DOCKSON  2,103,576
PRESSURE REGULATOR
Filed Jan. 9, 1935  2 Sheets-Sheet 2
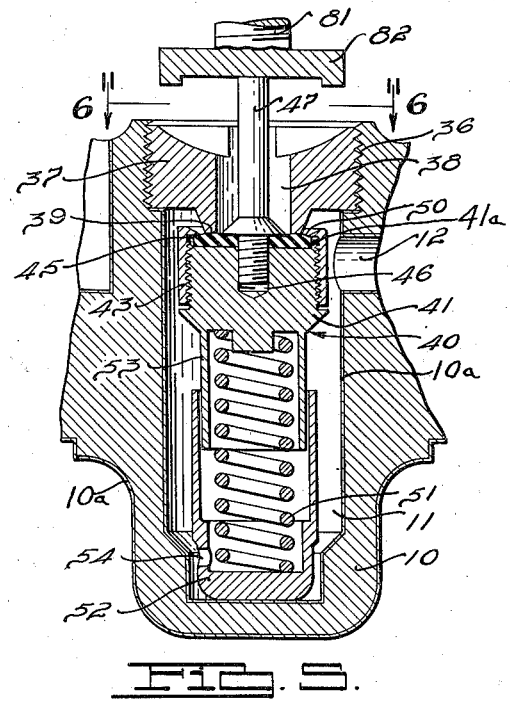
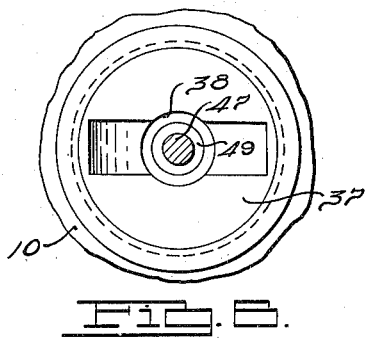
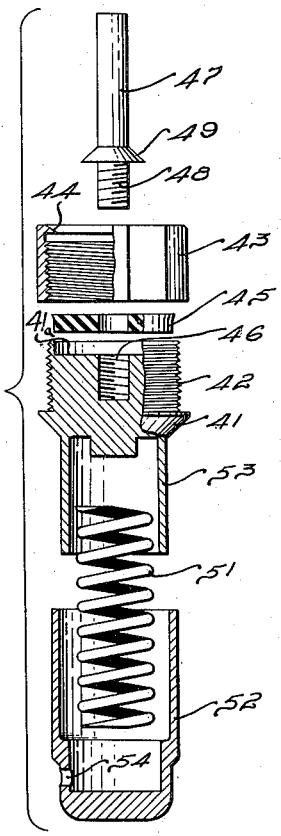
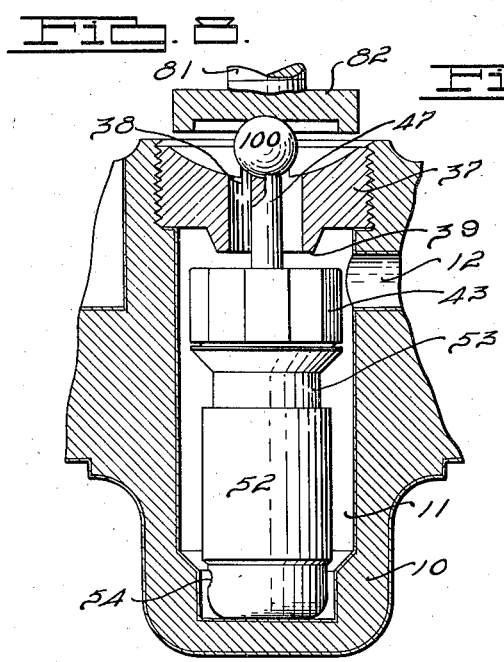
INVENTOR.
Charles H. Dockson.
BY Dike, Calver & Gray
ATTORNEYS.

Patented Dec. 28, 1937

2,103,576

UNITED STATES PATENT OFFICE 2,103,576

PRESSURE REGULATOR

Charles H. Dockson, Detroit, Mich.

Application January 9, 1935, Serial No. 960

8 Claims. (Cl. 50—23)

The present invention relates to a pressure regulator and particularly to a pressure regulator of the type used in conjunction with tanks or cylinders of gases under pressure and wherein the valve is used as a pressure regulating valve which permits the withdrawal and use of the gas from the tank or cylinder at pressures lower than the pressures maintained within the tank or cylinder.

Regulator valves of the conventional type heretofore generally in use for this purpose have not been satisfactory because such valves become rapidly impaired in operation due to a variety of circumstances; for example, small particles of free metal filings or the like, or small particles of dust, dirt, rust, scale or the like enter the valve in spite of every precaution and prevent a proper gas-tight seating of the valve. This results in a leakage of the high pressure gas therethrough and requires frequent repair and rebuilding of the regulator mechanism. In addition, there is a constant danger of firing of the valve when gas under high pressures is released from the pressure tank or cylinder and permitted to pass through the partially open valve. This is particularly true in connection with inflammable gases such as oxygen which are stored in a tank or cylinder at pressures of approximately 2,000 pounds per square inch.

In addition it has been found that valves of the conventional type permit fluctuation of discharge pressures over a wide range, frequently approximating seven to ten pounds. In certain operations this variation of pressure is very serious and has limited the usefulness of such valves.

It is an object of the present invention to provide a pressure regulating valve which is of a new and improved design and in which the valve member will seat at all times even though particles of foreign matter may have entered the valve.

It is a further object of the present invention to provide a regulator valve of new and improved construction in which the danger of firing the valve when partially open is eliminated.

It is a further object of the present invention to provide a regulator valve which by its new and improved construction permits accurate regulation, with little if any fluctuation, of the discharge pressures of the gas passing from the valve.

It is a further object of the present invention to provide a pressure regulator in which the pressure of the gas in the tank or cylinder is utilized to assist in maintaining the valve in a predetermined position without fluttering of the valve.

Other objects of this invention will appear in the following description and appended claims, reference being had to the accompanying drawings forming a part of this specification wherein like reference characters designate corresponding parts in the several views.

Fig. 1 is a cross sectional view in side elevation of a regulator embodying the present invention.

Fig. 2 is a sectional view taken substantially on the line 2—2 of Fig. 1 in the direction of the arrows.

Fig. 3 is an enlarged plan view of a safety disk member provided in the regulator.

Fig. 4 is a sectional view taken substantially on the line 4—4 of Fig. 3 in the direction of the arrows.

Fig. 5 is an enlarged fragmentary view in section showing the plug valve and nozzle in closed position.

Fig. 6 is a fragmentary plan view taken substantially on the line 6—6 of Fig. 5 in the direction of the arrows.

Fig. 7 is an enlarged view, partially in section, of the elements of the valve plug member prior to assembly.

Fig. 8 is a fragmentary sectional view showing a modified form of valve opening member.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawings, particularly to Fig. 1, 10 designates a body member, in the present instance formed as a die casting from a suitable zinc base die-casting alloy. There is on such casting a thin film or skin 10a approximately one sixty-fourth of an inch in thickness, which is a very fine grained dense metallic structure which prevents seepage or leakage of gas therethrough under high pressures, even as high as 20,000 pounds per square inch. The body 10 is provided with an interior well 11, an inlet port 12 communicating therewith, and an outlet port 13 which communicates with a port 14 leading to an upper chamber 15. A port 16 is formed in the body 10 and communicates with the well 11 and is provided with an enlarged threaded portion 17 to receive the screw-threaded shank of a pressure gauge 18 calibrated to measure the pressures of the gas passing through the inlet port 12 and into the well 11. A port 20 communicates with the upper chamber 15 and is provided with an enlarged threaded portion 21 to receive the screw-threaded shank of a pressure gauge 22 calibrated to measure the gas pressures in the chamber 15. A port 23 is provided in the body member 10 and communicates with the upper chamber 15 which is provided with an enlarged portion 24 threaded to receive the screw-threaded end of the safety plug member 25. The safety plug member 25 comprises a body member having an interior passageway extending longitudinally thereof, the outer end of the body member is screw threaded to receive the safety plug cap 26 provided with a central orifice 27 which communicates with the longitudinal passage in the body portion of the safety plug member. A safety disk 28 is interposed between the body of the safety member and the safety plug cap 26 and prevents passage of gas through the opening 27 except when pressures in the chamber 15 exceed certain predetermined limits. When the pressures exceed such predetermined limits the safety disk 28 is ruptured and the gas is permitted to escape from the chamber 15 through the port 23 to the atmosphere.

The inlet port 12 is provided with an enlarged portion 29 threaded to receive the end of the inlet plug 30. An inlet nut 31 adapted for attachment to the outlet of a pressure tank (not shown) is attached to the terminal end portion of the plug 30. An inlet screen 32 is interposed between the end of the inlet plug 30 and the inlet port 12 and serves to keep out some of the foreign matter such as scale, rust, and the like which otherwise would pass with the gas into the interior of the valve mechanism. The inlet screen 32 has fine openings therein but some small particles of foreign matter pass unavoidably into the interior of the valve.

The outlet port 13 is provided with an enlarged portion 33 threaded to receive the screw-threaded end of the outlet plug 34. The outlet plug 34 communicates with a hose coupling member 35 to which a hose (not shown) may be connected to carry the gas from the valve to the point where it is to be utilized.

The upper portion of the well 11 is provided with a threaded recess 36 into which the valve nozzle 37 is screw threaded. The valve nozzle 37 is provided with a central opening 38 extending through the body portion thereof and terminating in a depending nozzle portion 39 having a relatively flat edge which surrounds the lower end of the central opening 38. The opening 38 permits passage of the gas from the well 11 to the upper chamber 15 when the parts of the valve are in the relative positions shown in Fig. 1. The flow of gas from the well 11 is controlled by a spring actuated valve plug indicated generally at 40 which seats on the nozzle 39. As shown in greater detail in Figs. 5 and 7, the valve plug member comprises a seat 41 having a recessed portion 41a to receive the washer or disk 45. The seat 41 is screw threaded as at 42 to receive the screw-threaded cap 43 which is provided with an annular opening surrounded by a flange 44. A washer or disk 45 formed of soft resilient rubber is held on the top of the seat 41 and is clamped at its periphery by the flange 44 on the cap 43.

A threaded opening 46 is provided in the central portion of the seat 41 and a central orifice registering therewith is provided in the washer or disk 45. An operating pin 47 is provided with a male screw-threaded portion 48 and extends through the orifice in the washer or disk 45 and is screw threaded into the threaded opening 46. A flange 49 extends circumferentially outward from the pin 47 adjacent the screw-threaded portion 48 and is adapted to overlie the orifice in the disk or valve 45, the flange 49 thus serving to hold the central portion of the disk or washer 45 in clamped position on the top of the seat 41. In forming the disk or washer 45 I preferably make the disk or washer slightly larger than the top of the seat 41 so that when it is clamped in place by the flanges 44 and 49 the rubber in the disk or washer 45 is placed under compression adjacent the outer periphery and the central portions thereof. This causes the excess rubber to bulge and form a raised annular ring 50 between the clamping members, the said ring being positioned to contact with the lower edge of the nozzle 39 when the valve is in the closed position shown in Fig. 5. The raised annular ring 50 thus provides a resilient seat or cushion in which the flat portion of the depending nozzle 39 is received.

It will be noted that the valve operating pin 47 extends through the valve opening 38 and that the nozzle 39 occupies a position between the intermediate flanges 44 and 49. This construction and arrangement of parts and the use of soft rubber material in forming the disk or washer 45 provide a construction in which foreign matter, such as dust, dirt, or the like, which succeeds in entering the valve mechanism, will be embedded in the soft rubber ring 50 in the disk or washer 45. Thus such foreign particles will not affect the complete closure of the valve or permit leakage of gas therethrough. The seal which is thus provided in the valve is a non-leaking seal and has been used successfully with pressures in excess of 2,000 pounds per square inch without causing a leakage of gas through the valve. By providing the recess 41a, the washer 45 is confined about its periphery so that when clamped in place there is no opportunity for the high-pressure gas to enter between the washer 45 and the top of the valve seat 41. This prevents excess bulging of the washer 45 and permits the use of more flexible materials therein than in conventional construction. It also is to be observed that this construction is such that the flanges 44 and 49 are concentric with the lower edge of the nozzle 48 and placed closely adjacent thereto so that the space through which foreign matter must pass in order to reach the disk or washer 45 is very small.

The valve mechanism herein described is novel also in that it utilizes the pressure of the gas in the well 11 to assist in maintaining the valve in closed position. The valve 40 is held in closed position in the first instance by a coil spring 51 which seats in a thimble 52 and presses against the lower face of the valve seat 41. The bottom of the thimble 52 as here shown preferably abuts against the bottom of the well 11 and the spring 51 contained therein exerts a pressure upwardly against the valve seat 41. The thimble 52 is maintained in sliding telescopic relation with the depending thimble guide member 53 formed as an extension on the valve seat member 41. In normal operation the gas pressures in the well 11 may run as high as 2,000 pounds per square inch and would be exerted on all portions of the valve. The spring 51 is therefore required to so balance this pressure as to hold the valve seat in closed position on the nozzle. In certain conventional constructions the whole of the gas pressure has been exerted against the face portion of the valve so that the closure springs used therein have been required to exert high pressure on the valve and this in turn has caused rapid wear of the sealing disk or washer. This feature also has prevented the use of any soft material, such as soft rubber, in the formation of the sealing disk or washer, as such materials would not stand the high spring pressures. In the present instance no direct gas pressures are exerted on the valve seat, so the spring 51 is required to be only of sufficient strength to support the weight of the valve seat and so hold it in place against the nozzle. By providing an opening 54 in the base of the thimble 52 the gas under pressure in the well 11 will pass inside the thimble and exert a pressure on the underside of the valve. This serves to balance the pressures on both sides of the valve 40 and thus tends to maintain the seat 41 in position on the nozzle 39. It also has been found that the use of the thimble 52 on the spring 51 results in a more quiet operation of the valve than where a similar construction is used in which the thimble is omitted.

Gas under pressure can pass from the well 11 to the upper chamber 15 only through the opening 38 in the nozzle 39. The amount of gas which is permitted to pass therethrough determines in the first instance the pressure of the gas in the upper chamber 15, the chamber 15 being in effect an expansion chamber in which the pressure of the gas which flows through the opening 38 is reduced.

Control of the valve 40 is effected through the operating pin 41 which, when pressed downwardly as shown in Fig. 1, unseats the valve and permits the flow of gas through the nozzle 39 and the opening 38 to the chamber 15. The chamber 15 is sealed against leakage by a diaphragm 60 which extends over the top thereof and is provided with a downwardly extending circumferential flange 61 which extends over the peripheral lip or edge of the body 10 adjacent the chamber 15. A sealing washer or gasket 62 is disposed between the upper lip or edge of the body 10 and an adjacent face of the diaphragm 60, the sealing washer 62 being of flexible material which may be clamped in place and which forms a gas-tight seal between a face of the diaphragm and the upper lip or edge of the chamber 15.

The body 10 is provided with a male threaded portion 62 which is engaged by the female screw-threaded portion 64 of the cap 65. The cap 65 is provided with a shoulder 66 which contacts with a face of the diaphragm 60 directly above and opposite to the point of contact of the opposite face with the lip or edge of the body 10. By screwing the cap 65 on the body 10 the diaphragm 60 is clamped tightly between the shoulder 66 and the gasket 63 on the lip or edge of the body 10.

The cap 65 is provided with an adjusting screw 70 which is screw threaded in the end thereof and has a handle portion 71 and a depending end portion 72. The end portion 72 is preferably tapered and rounded as at 73 to seat within a pocket 74 in the plate 75 which is carried by the upper end of a coil spring 76. The lower end of the coil spring 76 bears upon a spring seat 77 which is mounted on and spaced from the diaphragm 60 by a washer 78 formed of flexible material. The spring seat 77 has an upwardly extending stud 80 which lies within the coils of the spring 76 and acts as a guide therefor. The inside of the stud 80 is tapped to provide a female screw-threaded portion into which a male screw-threaded shank 81 is placed. The shank 81 is formed as a part of the yoke 82 which has a face portion contacting with the upper end of the valve operating pin 47. The other face of the yoke 82 contacts with the lower face of the diaphragm 60. The screw-threaded shank 81 extends upwardly through an opening in the central portion of the diaphragm 60 and the flexible washer 78. When the shank 81 is screwed tightly in place in the stud 80, the diaphragm 60 is clamped securely between the spring seat 77 and the washer 78 on the one face and the yoke 82 on the opposite face. A plurality of openings 83 extend through the cap 65 and permit air under atmospheric pressure to fill the cap 65 on the side of the diaphragm opposite the chamber 15.

This construction provides a method of holding the diaphragm 60 in a manner which permits its "breathing" when the valve is in use and when the pressures inside the chamber 15 are sufficient to cause compression of the spring 76. The pressures in the chamber 15 are regulated as heretofore described by regulating the flow of gas through the nozzle 39. This in turn is controlled by the adjustment of the regulating screw 70 to exert a downward pressure on the yoke 82 through the spring 76 which in turn effects a depression of the pin 41 to the amount required to permit a predetermined flow of gas through the valve 40.

The safety disk 28 is shown in enlarged detail in Figs. 3 and 4 and comprises a body or shell portion 90 having a central opening 91 therein. This shell is formed as a perforated cup having an extending circumferential flange. Into this cup is placed a thin disk 92, preferably formed of a very thin rolled copper sheet. A washer 93 is then placed on top of the disk 92 and the circumferential flange is bent over and pressed tightly against the washer 93. When the circumferential flange is bent over and pressed tightly against the washer 93 it forms the rim 94. By this construction it is possible to form the washer 93 and the shell 90 of relatively thicker material than the disk 92 and so provide a safety member which it is possible to handle conveniently and to install in the regulator mechanism. By varying the thickness of the disk 92 and by change of material from which it is formed it is possible to provide for any desired predetermined pressures within the chamber 15 without rupturing of the disk 92. In using copper of approximately .001 inch in thickness in forming the disk 92 I have found that pressures up to approximately 350 pounds per square inch can be permitted in the chamber 15. Pressures in excess of 350 pounds per square inch will rupture the disk 92 and permit the gas to blow off through the safety opening 27 without damaging other portions of the mechanism.

The details of the foregoing construction are shown in the enlarged views comprising Figs. 5, 6, and 7.

In Fig. 8 is illustrated a valve operating mechanism which is designed to reduce the friction between the yoke 82 and the valve pin 47. In this construction the valve operating pin 47 is shortened and a ball bearing 100 is disposed between the upper end of the pin 47 and the lower face of the yoke 82. The operation of the structure of the other portions of the valve mechanism is the same as that heretofore described. This construction is desirable in certain instances, however, where there is a tendency for the pin 47 to bind against the yoke 82.

The use of a die casting in forming the body 10 is a new and novel feature of the present invention which results in the attainment of many desirable results in the construction of such a mechanism, which results cannot be achieved by the use of constructions of the conventional type employing brass castings and the like.

It will be observed that the body 10 is provided with numerous openings and ports which in the conventional type of construction using a brass casting must be machined into the casting. This results in the cutting off of fine particles of metal from the body of the casting in the form of turnings, filings, or the like, and these particles of free metal get into the body portion and into the ports. It is both difficult and expensive to clean the finished body portion in such a manner that the high-pressure gas will not drive certain of these fine particles into the valve mechanism and thus cause excessive wear on the valve mechanism. By die casting the part, however, all of the ports are formed in the die casting from the molten die metal. There is, therefore, no necessity for machining the part after it has been die cast. Thus there is provided a serviceable type of construction which is free from the serious defects in the use of the machined brass castings or forgings of the prior art. The casting also has a skin or film 10a of uniform density which is practically free from pores or voids and thus eliminates any possibility of leakage of gas therethrough. This skin or film 10a extends over all surfaces of the casting, including the inside of the parts where it acts in effect as a gas-tight lining.

In using machined brass castings or forgings it frequently happens that voids and fissures in the casting are opened by the machining operations. This frequently requires scrapping of a part which is nearly completed and thus greatly increases the costs in the manufacture of such valves.

The provision of the well 11 permits an initial expansion of the gas as it passes through the inlet port 12 under relatively high pressure. This expansion of the gas in the well 11 effects an immediate reduction in the pressure of the gas so that if the valve should not be tightly seated at the time that the gas is passed into the well 11, the gas will pass through the nozzle 39 at a velocity lower than that at which it passes from the pressure tank or cylinder. This retardation of the velocity of the gas prevents a "flashing" or exploding of the gas within the valve as now occurs whenever a conventional type of valve is opened slightly and a gas such as oxygen is passed through the valve at relatively high pressures, this "flashing" or exploding of the gas being due to the heat of friction resulting from the high velocity passage of the gas through the restricted apertures of the valve.

A valve of the present invention is easily assembled and is very efficient in operation. Valves of conventional construction, on the other hand, are very difficult to assemble and are relatively inefficient in operation. Valves of the conventional construction frequently permit a variance of pressure in the upper chamber 15 between approximately seven and ten pounds through the outlet. If, for example, it is desired to have the gas supplied to the outlet at a pressure of, say, thirty-two pounds per square inch, this variation means that the pressure may drop to between twenty-two and twenty-five pounds. A regulator of the present construction has been found to control such pressures within much narrower limits, the control usually being within approximately one pound of variation.

I claim:

1. A pressure regulator to be used with pressures up to approximately 2000 pounds per square inch comprising a die-cast body portion provided with an inlet port communicating with a central high-pressure well integral with said body portion and a low-pressure chamber communicating with said well, said low-pressure chamber having an outlet port therein, said well and chamber having a lining of fine grained metal substantially impervious to fluid seepage under pressures up to approximately 2000 pounds per square inch, a pressure reducing valve within said low-pressure chamber and comprising a rigid valve nozzle, a valve seat having a recessed face portion, a readily flexible washer secured centrally of said recessed face portion, clamping means secured to said valve seat and adapted to clamp the circumferential edge of said washer and maintain said washer in intimate contact with said valve seat, a resilient member acting on said valve seat and tending to hold said flexible washer in intimate contact with said nozzle, and pressure regulating means comprising a flexible diaphragm extending over said low-pressure chamber, a spring disposed above said diaphragm and bearing thereon, a valve operating member depending from said diaphragm and adapted to contact a stem on said valve and unseat said valve seat from said nozzle, and adjustable means for compressing said spring, thereby to control the pressures on said diaphragm for regulating the pressures directly exerted on the gas in said low-pressure chamber and for operating said valve to control the flow of gas from said well to said low-pressure chamber.

2. A pressure regulator to be used with pressures up to approximately 2000 pounds per square inch comprising a die-cast body portion formed integrally to provide an inlet port and a communicating central well, a low-pressure chamber communicating with said well and having an outlet port therein, said ports, well and chamber having a densely formed lining of fine grained metal substantially impervious to fluid seepage under pressures in excess of 2000 pounds per square inch, and a pressure reducing valve comprising a valve seat having a rigid valve plug member, a valve stem screw threaded into the central portion of said plug and having a flange extending outwardly therefrom adjacent the upper face thereof, a soft rubber washer clamped between said flange and said valve plug member and extending outwardly from said stem, an annular clamping member screw threaded on the periphery of said plug member and having a shoulder overlying and clamping the peripheral edge portion of said soft rubber washer between a face of said annular clamping member and a face of said rigid valve plug member.

3. A pressure regulator to be used with pressures up to approximately 2000 pounds per square inch comprising an integrally formed die-cast body portion provided with an inlet port communicating with a central high-pressure well, a low-pressure chamber communicating with said well and having an outlet port therein, said ports, well and chamber having a densely formed lining of fine grained metal substantially impervious to fluid seepage under pressures in excess of 2000 pounds per square inch, a pressure controlling valve mounted within said high-pressure well and comprising a valve seat having a rigid valve plug member, a valve stem screw threaded into the central portion thereof and having a flange extending outwardly therefrom adjacent the face of said valve plug member, a soft rubber washer clamped between said flange and said valve plug member and extending outwardly therefrom, an annular clamping member screw threaded on the periphery of said plug member and having a shoulder overlying and clamping the peripheral edge portion of said soft rubber washer, a rigid valve nozzle secured to said body portion between said well and chamber, a resilient valve control member tending normally to hold said valve seat on said nozzle, regulating means comprising a compression spring, means for varying the compression on said spring, valve operating means actuated by said spring and adapted to unseat said valve from said nozzle and permit the controlled passage of gas from said well to maintain a substantially constant and reduced pressure on gas in said low-pressure chamber.

4. A pressure regulator to be used with pressures up to approximately 2000 pounds per square inch comprising a die-cast body portion integrally formed to provide an inlet port, a central well communicating therewith, a low-pressure chamber formed in said body portion and in communication with said well, an outlet port in said low pressure chamber, the surface of said body portion, the lining of said chamber, well and ports having a gas-tight skin of fine grained, dense substantially imperforate metal impervious to gas under pressures exceeding approximately 2000 pounds per square inch, and a pressure reducing valve disposed entirely within said well and adapted to regulate the passage of gas from said well to said low-pressure chamber in response to decreases in gas pressures therein.

5. A pressure regulator to be used with pressures up to approximately 2000 pounds per square inch comprising a one-piece die-cast body portion provided with an inlet port communicating with a central well, a low-pressure chamber integral with said body portion and communicating with said well, an outlet port communicating with said low-pressure chamber, said ports, well and chamber having a lining of dense substantially imperforate material substantially impervious to fluid seepage under pressures in excess of 2000 pounds per square inch, a pressure reducing valve interposed between said well and said chamber and comprising a movable valve seat enclosed by said well and having a rigid valve plug member, a recessed top surface thereon, a resilient rubber washer mounted in said recessed top surface, clamping members secured to said plug and adapted to hold said rubber washer under compression at its circumferential edge portion and its central portion, said rubber washer having a circumference greater than the circumference of the recessed top surface of said rigid valve plug member whereby an annular raised collar is provided in the said rubber washer, said collar portion being concentric with and lying intermediate said clamping members, a rigid valve nozzle having its terminal end portion disposed between and concentric with said clamping members, a resilient member acting on said valve seat to hold said washer in intimate contact with said nozzle, and regulating means for unseating said valve from said nozzle to control the passage of gas from said well to said chamber within predetermined limits.

6. In a pressure regulator to be used with pressures up to approximately 2000 pounds per square inch, a die-cast body portion comprising an integrally formed high-pressure inlet port and central well communicating therewith, and a low-pressure chamber integral with said body portion and having an outlet port formed therein, said ports, well and chamber having a dense substantially imperforate lining portion adapted to prevent the seepage of gas therethrough under pressures in excess of approximately 2000 pounds per square inch, a valve member disposed between said well and said low-pressure chamber.

7. In a pressure regulator to be used with pressures up to approximately 2000 pounds per square inch, a body portion having a low-pressure chamber and a high-pressure chamber having a lining therein of fine grained material integrally formed on the surfaces of said body portion exposed to fluid pressure to prevent the seepage of high-pressure fluid therethrough under pressures in excess of approximately 2000 pounds per square inch.

8. In a pressure regulator to be used with pressures up to approximately 2000 pounds per square inch, a die-cast body portion including a high-pressure chamber and having a fluid pressure-exposed surface comprising an integral layer of fine grain metal to prevent seepage of fluid therethrough under pressures in excess of approximately 2000 pounds per square inch.

CHARLES H. DOCKSON.